Aug. 10, 1948.　　　K. M. McLELLAN　　　2,446,979
CANDLE FILTER MOUNTING
Filed June 30, 1944

Inventor
KENNETH M. McLELLAN
By Frederick L. Bissinger
Attorney

Patented Aug. 10, 1948

2,446,979

UNITED STATES PATENT OFFICE 2,446,979

CANDLE-FILTER MOUNTING

Kenneth M. McLellan, Cleveland, Ohio, assignor to Industrial Rayon Corporation, Cleveland, Ohio, a corporation of Delaware Application June 30, 1944, Serial No. 542,965

4 Claims. (Cl. 210—164)

This invention relates to filters for use in filtering relatively viscous solutions such as those employed in the production of artificial threads, bands, ribbons, sheets and the like and, more particularly, it relates to filters which are used to filter such solutions just prior to their extrusion through suitable orifices. The invention provides a novel mounting for such filters and particularly for that form of filter commonly referred to as a "candle-filter."

For convenience, the invention will hereinafter be described with reference to the production of rayon by the viscose process, but it is to be understood that the invention is not limited in its application to this process. In producing viscose rayon, it is common practice to extrude a cellulosic solution commonly termed "viscose" through a spinneret into a coagulating bath. Prior to its extrusion through the spinneret, the viscose passes through a metering pump and a candle-filter. The filter is intended to remove objectionable impurities which may be in the viscose and which may tend to interfere with the proper extrusion of the viscose through a spinneret.

The conventional type of candle-filter used in viscose rayon production has an opening at its base through which the viscose enters and another opening at the top of the filter housing through which the filtered viscose passes on to the extrusion point. When the filtering element becomes clogged, it is of course necessary to remove it for cleaning or replacement. Because of the construction of the candle-filter, however, this requires dismantling of the viscose piping system adjacent to the candle-filter. It is of course evident that such a procedure requires considerable time and labor.

This invention provides a candle-filter which can be permanently mounted in the viscose pipe line and at the same time permits ready removal if it should become clogged. This is accomplished by providing the candle-filter with a new form of mounting or base member having separate inlet and outlet passages communicating with the interior of the candle-filter housing.

The invention will be more fully described by reference to the accompanying drawing in which.

Figure 1:
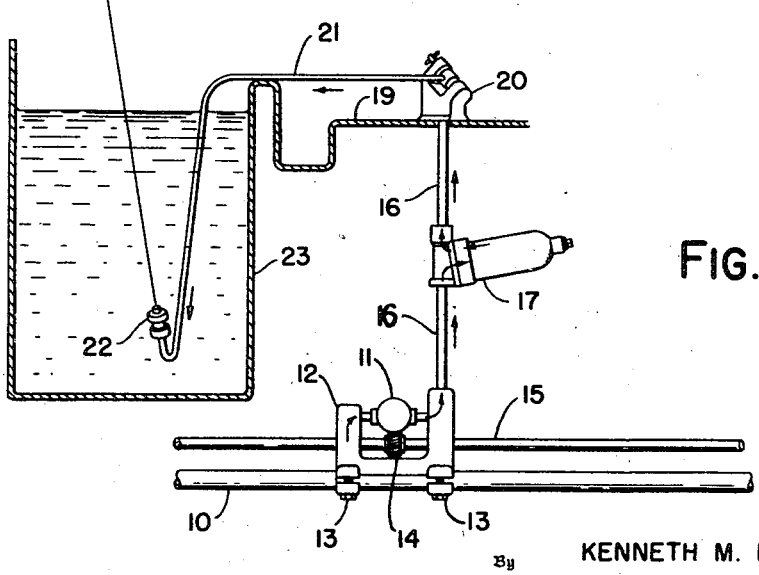
Figure 1 is a diagrammatic representation of the portion of a viscose-spinning apparatus containing the candle-filter.

As shown in Figure 1, a viscose solution passes from manifold 10 to a gear-driven metering pump 11 mounted in a pump bracket 12 clamped onto the manifold as by means of stud bolts 13. The metering pump 11 is driven by gear 14 fixed on a driving shaft 15 adjacent and parallel to the manifold 10. From the metering pump the viscose solution passes into conduit 16 and then through the candle-filter 17. From there it is led to an apron block 20 mounted on apron 19 of tank 23. The viscose passes through the apron block and into a mass tube 21 which is pivotally mounted on the apron block. This viscose is extruded through a spinneret 22 at the end of the mass tube into a coagulating bath contained in the tank 23.

As indicated by the arrows in Figure 1, the viscose solution in passing through the candle-filter enters the base of the filter at one end, then passes through the filtering element positioned generally at right angles to the base; the viscose solution leaves the filter at the opposite end of the base and passes on to the subsequent portions of the viscose system. The base of the candle-filter is the only part that is mounted directly in line with the viscose piping system. The filtering element, as stated, is mounted in the base at generally a right angle to the base. This manner of mounting the candle-filter enables a prompt removal of the filtering element without disturbing the apparatus in which the candle-filter base is located.

It will be noted that the filtering element is mounted in the candle-filter base at a slight angle, the angle at all times being toward the vertical. This slight angular positioning of the filtering element permits more readily the escape of entrapped air through the top of the filter upon a removal of a plug in the top of the filter housing at the time when viscose is first forced through the system after a stoppage.

Figure 2:
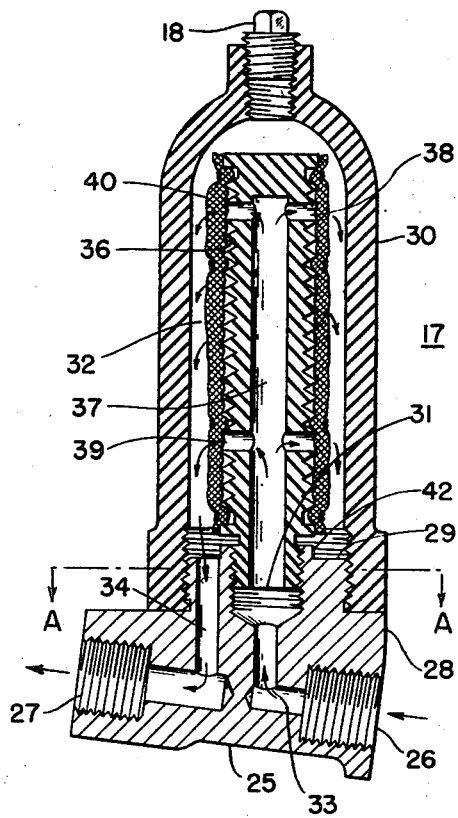
Figure 2 represents the new candle-filter in cross section.
Figure 3:
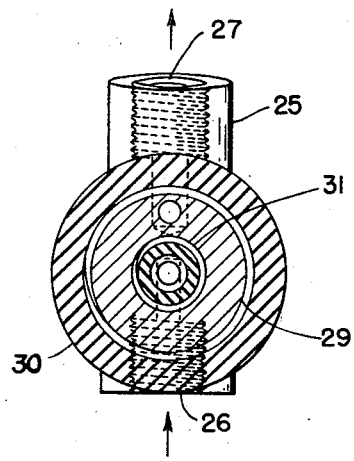
Figure 3 is a plan view of Figure 2 taken across line A—A.

The candle-filter and particularly its base are shown in greater detail in Figures 2 and 3. As there shown, the candle-filter comprises a base 25 of generally circular cross section having an inlet 26 at one end and an outlet 27 at the other, both of such size as to receive conduit 16. Base 25 has thereon a generally circular circumferentially threaded boss 29 which has a generally concentric collar 28. A cylindrical cover or housing 30 is threaded on the boss, its base bearing tightly against the face of collar 28 thus preventing the escape of viscose from between the contacting surfaces.

The boss 29 has bored out centrally thereof a hole 31 extending substantially to a depth corresponding to the height of the boss. The bore 31 is threaded to permit the screwing therein of a filter element 32. A passage 33 is provided in the base 25 joining the inlet 26 with bore 31. Adjacent the bore and in the boss, another passage 34 is provided joining the interior of cover 30 with the outlet 27 of base 25.

The filtering element 32 comprises a serrated member 36 having an internal longitudinal passage 37 throughout substantially its length and at least two radial passages 38, 39 at, generally, either end. The member 36 has a threaded base adapted to be screwed into the bore 31. The radial passages 38, 39 extend from the longitudinal passage 37 to the exterior of member 36. Further, member 36 is covered with a filtering cloth 40 which is securely tied to the member at several points in circumferential recesses provided therefor and in the serrations. Viscose enters the longitudinal passage 37 of member 36, then is forced outwardly through the radial passages 38, 39 against and through the filtering cloth 40 into the space between cover 30 and the filtering cloth, then into outlet passages 34 and 27.

On the boss 29 and circumferentially of bore 31, there is provided a ridge 42 to provide a seat or a bearing surface for member 36 when fully turned into bore 31. Member 36 is shown as not being fully turned into the bore in order that the contacting or bearing surfaces may be seen more clearly.

The filter mounting has been described with reference to a vertical installation. In such installation it is desirable to provide an angularly positioned boss to facilitate the escape of gases; however, in generally horizontal installations the boss may be positioned at a right angle.

I claim:

1. In combination, a viscose supply source, a pump connected to said supply source, a conduit joining said pump to a mass tube having a spinneret in its end, a candle-filter in said conduit for filtering the viscose prior to its extrusion through said spinneret, said candle-filter comprising a base member, said base member having inlet and outlet passages having a common axis and adapted to be positioned in said conduit, a boss on said base member positioned at an acute angle to the common axis of the inlet and outlet, a removable housing member held by said boss in a direction inclining to the vertical, means for venting said housing, a removable filtering element in said housing and on said boss, said boss having a bore adapted to receive said filtering element and communicating with one of said passages and another opening joining the other of said passages with the interior of said housing, a collar surrounding said boss and having a surface adapted to engage one end of said housing to form a seal therewith, and a concentric ridge around said bore adapted to engage said filtering element to also form a seal therewith.

2. A filter for filtering out foreign matter and entrapping gases in the production of materials by an extrusion process comprising, a base member mounting adapted to be positioned in a substantially vertical line through which said materials flow, said base member including separate inlet and outlet passages having a common axis, a filtering element communicating with one of said passages positioned on said base member at an upwardly inclined angle to the axis of said passages, and a housing for said filtering element positioned on said base member at substantially the same upwardly inclined angle receivable by said base member, said angularly positioned housing entrapping gases passing through the filter, and the interior of said housing communicating with the other of said passages in said base member.

3. A candle-filter for filtering out solution impurities and for entrapping gases from a solution flowing therethrough comprising, a base member adapted to be mounted in a substantially vertical line including separate inlet and outlet passages having a common axis, a boss positioned on said base member at an upwardly inclined angle to said common axis having at least two passages communicating with said inlet and outlet passages, the axes of said passages being at substantially the same said upwardly inclined angle to the axis of said inlet and outlet passages, a filtering element for filtering out solution impurities positioned on said boss at substantially the same said upwardly inclined angle communicating with one of the passages in said boss, and a housing mounted on said boss being positioned thereon at substantially the same said upwardly inclined angle enclosing said filtering element and the other of said passages of said boss, said upwardly inclined housing also being adapted to entrap gases given up by said flowing solution.

4. A candle-filter for filtering flowing cellulose solutions and entrapping gases therefrom comprising a base member adapted to be positioned in a substantially vertical line having separate inlet and outlet passages having a common axis, a boss positioned on said base member at an upwardly inclined angle having passages communicating with said inlet and outlet passages of said base member, a concentric ridge on said boss and around one of said passages, a removable filtering element for filtering said solutions positioned in said ridged passage at substantially the same said upwardly inclined angle and having a base adapted to engage said ridge to form a seal therewith, a collar surrounding said boss, a removable housing mounted on said boss at substantially the same upwardly inclined angle and having a base adapted to engage said collar to form a seal therewith, said housing being adapted to entrap gases from said flowing solutions, and a removable means in substantially the top of said upwardly inclined housing being adapted to be removed therefrom for a periodic venting of said housing.

KENNETH M. McLELLAN.

REFERENCES CITED

The following references are of record in the file of this patent:

UNITED STATES PATENTS

| Number | Name | Date |
| --- | --- | --- |
| 702,382 | Topham | June 10, 1902 |
| 1,755,432 | Lomax | Apr. 22, 1930 |
| 1,811,795 | Kirby | June 23, 1931 |
| 1,841,492 | McNulty | Jan. 19, 1932 |
| 1,937,415 | Sidney | Nov. 28, 1933 |
| 1,999,913 | Merritt | Apr. 30, 1935 |
| 2,007,336 | Malivert | July 9, 1935 |
| 2,076,935 | Burckhalter | Apr. 13, 1937 |
| 2,097,828 | Baldwin | Nov. 2, 1937 |
| 2,249,928 | Allquist et al. | July 22, 1941 |
| 2,322,131 | Heftler | June 15, 1943 |